United States Patent [19]

Ripberger

[11] Patent Number: 4,843,952
[45] Date of Patent: Jul. 4, 1989

[54] LOW-HEIGHT ARTICULATED PISTON WITH SKIRT-OVERHANGING GUIDE PORTIONS ON HEAD

[75] Inventor: Emil Ripberger, Remseck, Fed. Rep. of Germany

[73] Assignee: Mahle GmbH, Fed. Rep. of Germany

[21] Appl. No.: 110,713

[22] PCT Filed: Dec. 2, 1986

[86] PCT No.: PCT/DE86/00491

§ 371 Date: Aug. 4, 1987

§ 102(e) Date: Aug. 4, 1987

[87] PCT Pub. No.: WO87/03663

PCT Pub. Date: Jun. 18, 1987

[30] Foreign Application Priority Data

Dec. 4, 1985 [DE] Fed. Rep. of Germany ....... 3542800

[51] Int. Cl.$^4$ .................. F16J 1/02; F16J 1/16
[52] U.S. Cl. ......................... 92/190; 92/237; 92/238; 92/239
[58] Field of Search .............. 92/216, 232, 233, 237, 92/238, 187, 189 R, 190, 215; 74/579 E; 123/193 P

[56] References Cited

U.S. PATENT DOCUMENTS

| | | | |
|---|---|---|---|
| 1,221,419 | 4/1917 | Clark | 92/216 X |
| 1,559,800 | 11/1925 | Spillman | 92/232 |
| 1,772,931 | 8/1930 | Dusevoir | 92/233 X |
| 1,926,329 | 9/1933 | Chilton | 92/239 |
| 3,452,649 | 7/1969 | Cornet | 92/232 X |
| 3,971,355 | 7/1976 | Kottman | 92/238 X |
| 3,987,709 | 10/1976 | Day | 92/232 |
| 4,180,027 | 12/1979 | Taylor | 92/216 X |
| 4,702,151 | 10/1987 | Munro et al. | 92/237 |

FOREIGN PATENT DOCUMENTS

| | | | |
|---|---|---|---|
| 3602576 | 7/1987 | Fed. Rep. of Germany | 123/193 P |
| 686883 | 7/1930 | France | 92/238 |
| 279818 | 11/1930 | Italy | 92/238 |

Primary Examiner—Robert E. Garrett
Assistant Examiner—George Kapsalas
Attorney, Agent, or Firm—James Creighton Wray

[57] ABSTRACT

A two-part, low compression height, open-ended hollow skirt-type piston for internal combustion engines has a piston pin creating an articulated connection of the separate skirt and head parts. Guide portions (5) protruding axially in the direction of the piston axis provide lateral guidance and support of the piston head (1) in the piston-pin-axis direction. Each of the guide portions forms a gap with the nearby gudgeon pin boss (3). The gaps receive opposite parallel flat surfaces (4) of the skirt (2). The overhanging guide portions (5) have partly circular recesses permitting assembly of head and skirt with the gudgeon pin.

4 Claims, 1 Drawing Sheet

LOW-HEIGHT ARTICULATED PISTON WITH SKIRT-OVERHANGING GUIDE PORTIONS ON HEAD

BACKGROUND OF THE INVENTION

1. Field of the Invention

The invention relates to pistons especially pistons for internal combustion engines.

2. Description of the Prior Art

Such pistons are known from Fed. German P.S. No. 2,351,994. A low compression height of the piston is achievable due to the fact that a ring band of the piston head surrounds the skirt whereby the piston pin can be placed so far upwards in the piston skirt that the upper zone of the skirt bore receiving the piston pin can come to lie above the lowermost piston ring groove in the piston head.

In pistons of such formation it can occur that in specific cases, especially those where the lateral guidance of the connection rod takes place in the piston head, with a low height of the cylindrical guide portion of the piston head there is no longer adequate lateral guidance of the piston head in the direction of the axis of the piston pin.

SUMMARY OF THE INVENTION

The object of the present invention is to provide a remedy of this defect.

According to the invention a piston comprises a head part having a substantially cylindrical surface for sliding engagement within the inner cylindrical surface of a cylinder bore of an interal combustion engine, gudgeon pin bosses extending from said head part and spaced radially inwardly of said cylindrical surface, said bosses having coaxial skirt part lying within a projection of the cylindrical surface and surrounding the gudgeon pin bosses, said skirt part having axial bores therein coaxial with the bores of the bosses, and a gudgeon pin passing through the bores of said bosses and said skirt to secure the skirt pasrt to the head part, the improvement comprising the provision of (a) two oppositely diposed flat surfaces of said skirt through which pass the axial bores, said flat surfaces being substantially parallel to each other and form chords of the projected cylindrical surface, defining with the latter segmental spaces, and (b) guide portions integral with the head overhanging the exterior of the skirt by at least 10% of the longitudinal length of the skirt and located adjacent the opposite ends of the pin against said flat surfaces of said skirt, said guide portions extending in a direction away from said head into the segmental spaces and having part circular recesses permitting passage of the gudgeon pin on assembly.

Also from Fed. German P.S. No. 1,291,955 a piston is already known in which the skirt extends out far above the pin bosses lying therebeneath. However this construction is not comparable with the construction according to the invention, since piston head and skirt are not separate from one another.

BRIEF DESCRIPTION OF THE DRAWINGS

An example of embodiment of the invention is illustrated in the accompanying drawing, wherein.

DESCRIPTION OF THE PREFERRED EMBODIMENT(S)

Figure 1:
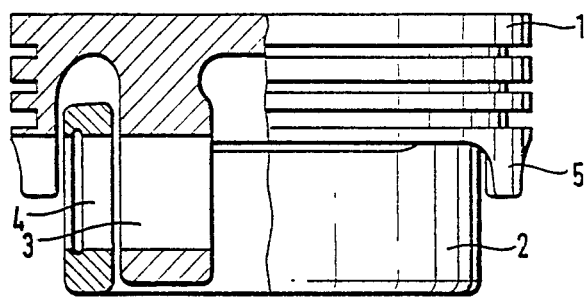
FIG. 1 shows a piston partially in longitudinal section and partially in elevation.
Figure 2:
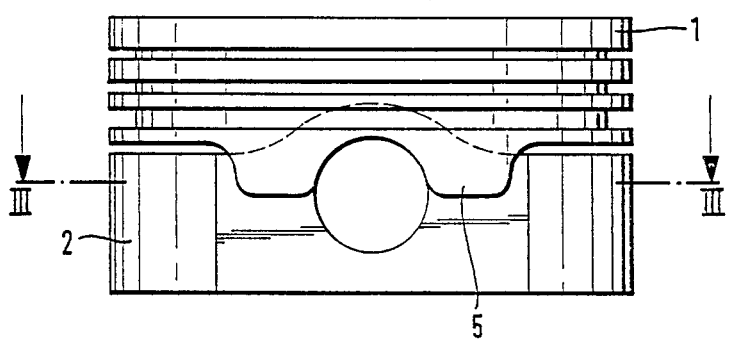
FIG. 2 shows a lateral elevation of the piston.
Figure 3:
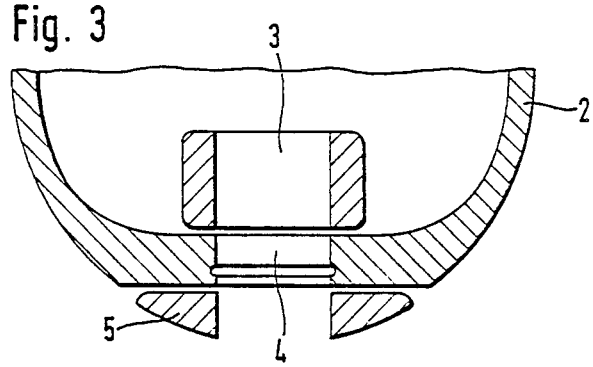
FIG. 3 shows a section through the piston along the line III—III on FIG. 2.

The piston is composed of a piston head 1 and a piston skirt 2. These two parts are connected with one another by a piston pin (not shown) which engages in boss bores 3 of the piston head 1 and bores 4 in the piston skirt 2. At opposite ends of the piston pin a guide portion 5 on each side extends from the piston head 1 radially out beyond the skirt 2 and extends in the direction of the piston axis approximately to the level of the piston pin axis. Openings for the passage of the piston pin are provided in these guide portions 5 which overhang the skirt 2. The guide portions 5 extend beyond the lower edge of the head part in the direction of the piston axis, at least 10%, preferably at least 20% and preferably by about 40% of the length of the piston skirt 2. In the circumferential direction the region in which the guide portion 5 overlaps the skirt 2 measures about 60°, the portion 5 extending in each case symmetrically in relation to each side of the piston pin axis.

The skirt 2 adjacent opposite ends of the pin is of less diameter than the remainder circular parts of the skirt so as to provide two flat surfaces engageable by the guide portions 5.

The two guide portions 5 lying at opposite ends of the piston pin and protruding beyond the skirt 2 guarantee good lateral guidance of the piston head 1. This is especially important in the lateral guidance of the connecting rod articulated to the piston, within the piston head 1.

The guide portions extend into segmental spaced formed between the flat surfaces of the skirt and a projection of the substantially cylindrical surface of the skirt.

I claim:

1. An internal combustion engine piston comprising a head part having a substantially cylindrical surface for sliding engagement within the inner cylindrical surface of a cylinder bore of an internal combustion engine; a pair of gudgeon pin bosses extending from said head part and spaced radially inwardly of said cylindrical surface, said bosses having coaxial bores formed therein to receive a gudgeon pin; a pair of guide portions integral with the head and each located radially outside and adjacent a respective gudgeon pin boss, each of said guide portions extending longitudinally in a direction away from said head and forming a respective gap between it and the respective gudgeon pin boss and each having a partly circular recess permitting passage of said gudgeon pin during assembly; and a substantially annular skirt part lying within a projection of the cylindrical surface and surrounding the gudgeon pin bosses and passing through said gaps; said skirt part having gudgeon pin bores therein coaxial with the bores of the bosses so that when a gudgeon pin is assembled in said bosses it passed through said gudgeon pin bores to secure the skirt part to said head part, and said skirt part having a pair of oppositely disposed parallel flat surfaces located where said skirt part passes through said gaps, said gudgeon pin bores passing through respective ones of said flat surfaces.

2. A piston according to claim 1, wherein the guide portions extend longitudinally of the piston by about 20% of the length of the skirt.

3. A piston according to claim 1, wherein the guide portions extend longitudinally of the piston by about 40% of the length of the skirt.

4. A piston according to claim 3, wherein each of the guide portions extends around the skirt over an angle of about 60°.

* * * * *